July 29, 1924.
D. ROSEN ET AL
1,503,380
BATTERY CONSTRUCTION
Filed Nov. 10, 1921       2 Sheets-Sheet 2
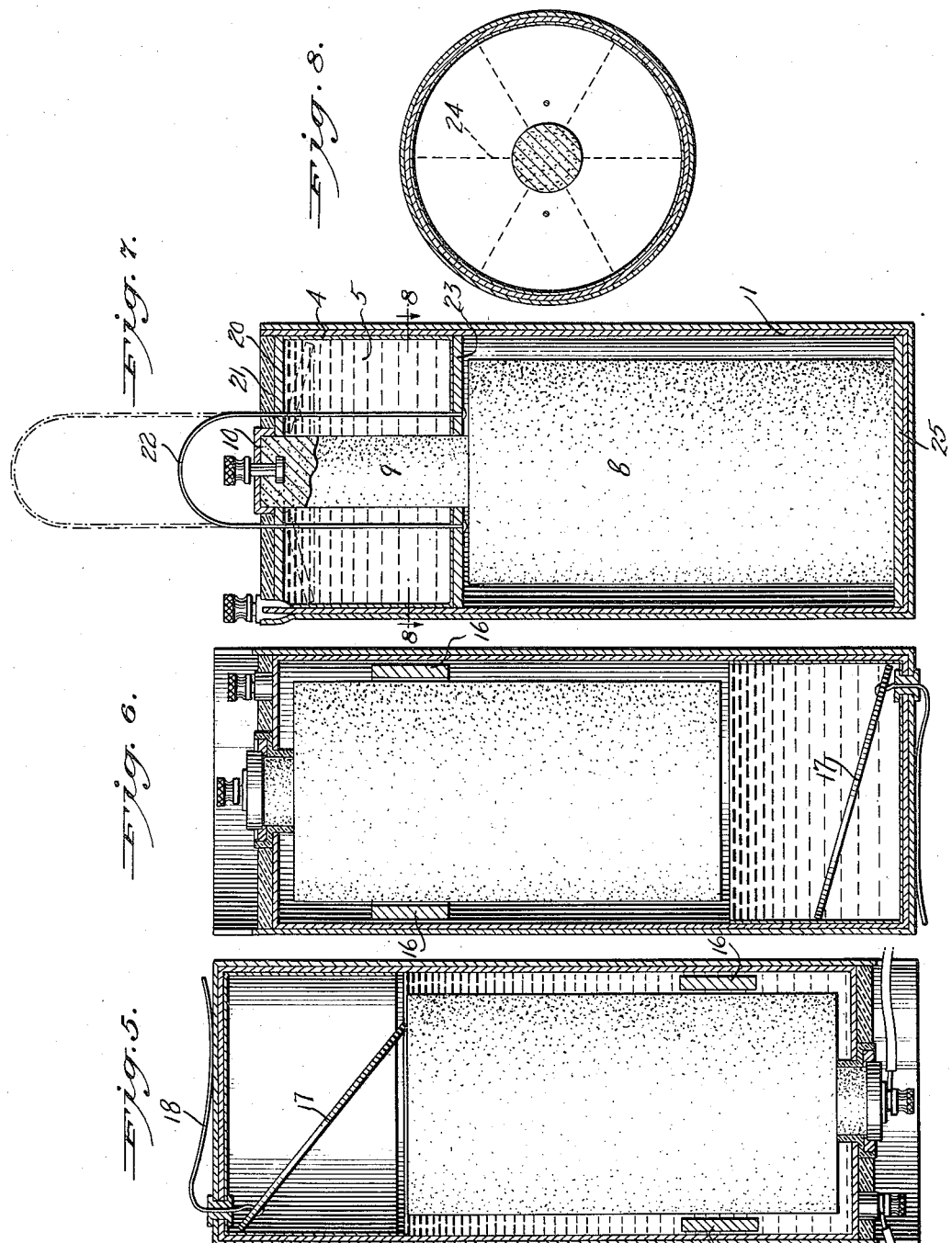
WITNESSES
INVENTORS
David Rosen
Conrad Schickerling
BY
ATTORNEYS Patented July 29, 1924.

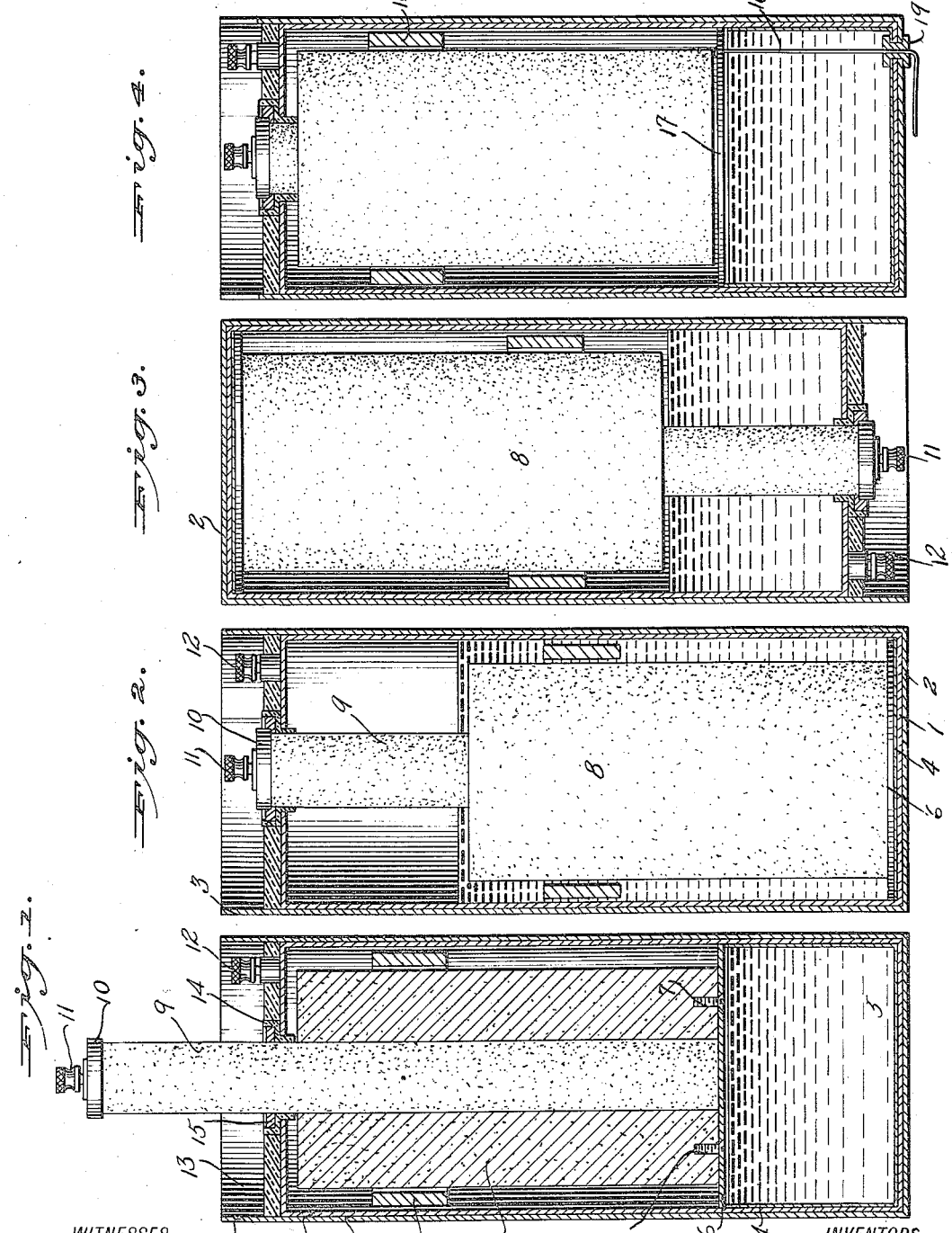

1,503,380

UNITED STATES PATENT OFFICE.

DAVID ROSEN, OF NEW YORK, N. Y., AND CONRAD SCHICKERLING, OF WEEHAWKEN, NEW JERSEY; SAID SCHICKERLING ASSIGNOR TO SAMUEL RUBINSKY, OF NEW YORK, N. Y.

BATTERY CONSTRUCTION.

Application filed November 10, 1921. Serial No. 514,299.

*To all whom it may concern:*

Be it known that we, DAVID ROSEN and CONRAD SCHICKERLING, citizens, respectively, of the United States and Germany, and residents, respectively, of the city of New York, borough of Manhattan, in the county and State of New York, and Weehawken, Hudson County, New Jersey, have invented a new and Improved Battery Construction, of which the following is a full, clear, and exact description.

This invention relates to a battery, and has for an object the provision of a battery construction whereby batteries may be sold to electrical supply dealers and kept on their shelves for an indefinite time without deterioration.

Another object resides in the provision of means whereby the battery, by a simple manipulation, can be rendered ready for service or operative at will.

A further object resides in the provision of means whereby after the battery has been in service or operative for any length of time it may be, by a simple manipulation, rendered inoperative, so that except when the battery is desired to furnish electrical energy it may be rendered inoperative and thereby the life of the battery be greatly prolonged.

A still further object resides in the simplicity of construction of the battery whereby the cost of manufacture is considerably reduced.

Another object resides in the particular construction and arrangement of parts which are hereinafter described and claimed and shown in the accompanying drawings.

The invention is illustrated in the drawings, of which—

Figures 1, 2 and 3 represent vertical sections of one form of battery showing the parts in different positions.

Figs. 4, 5 and 6 are similar sections showing the different positions of a slightly modified form of battery.

Fig. 7 is a similar section of a slightly further modified form of battery.

Fig. 8 is a horizontal section taken on the line 8—8 of Fig. 7.

This invention is related to a copending application, Serial No. 423,831, filed November 13, 1920, in the name of David Rosen.

The forms of the invention shown in the drawings are preferred forms which disclose and have a common operative principle, but it is, of course, understood that various other modified forms and constructions of batteries involving this principle may be made without departing therefrom.

For example, in Fig. 1 we show a battery having a zinc container 1 surrounded by a cardboard covering or casing 2 which at the upper end 3 extends considerably over the top of the zinc container. Within this zinc container 1, along the lower portion thereof, is a lining of any suitable insulating material such as 4 which may be made of wax. This forms a sort of chamber within which any suitable liquid 5 adapted to act as an electrolyte may be disposed. This chamber is partioned off from the rest of the battery normally by a partition 6 which may be of any suitable material but is preferably cardboard. This partition 6 is connected by such means as screws 7 to the bottom of a pole 8 preferably made of carbon. A bar or rod of carbon 9 extends through the pole 8 and through the upper portion of the zinc container 1, to a point without the battery, and on the top of this rod of carbon is a conducting cap 10 and a binding post 11. A binding post 12 is connected to the upper portion of the zinc container 1, and a layer of asphalt or any other suitable insulating material such as 13 is poured on top of the zinc container. A gasket or sleeve of insulating material 14 surrounds the carbon rod 9 and separates it from the aperture in the zinc container 1 through which it passes. This sleeve is provided with a recess in which a layer of wax 15 may be disposed.

The carbon pole 8 may be definitely spaced from the zinc container 1 by means of any suitable spacing means, such as a spacing device 16. This device may or may not be in the form of a ring, and constructed and disposed to rigidly hold the pole 8 in any definite position within the battery. In this case it does not definitely hold the pole 8 in any position. The pole 8 is held in the position shown by reason of the fact that the diaphragm or partition 6 rests on the top edge of the wax lining 4. As long as this partition is disposed between the electrolyte 5 and the pole 8 it will remain in this portion of the battery and there will be no electrolytic action taking place. By this means, therefore, the battery may be placed in this position in any storage place and kept indefinitely without deterioration. On the other hand, after it is sold, if it is desired to render the battery operative it is merely necessary to push down on the carbon bar 9 to move it to the position shown in Fig. 2, whereupon the partition 6 forces the wax 4, or moves aside the wax lining 4, and is moved to the position at the bottom of the container 1, thereby displacing the liquid electrolyte 5 and moving it to a different level, as shown in Fig. 2, whereby it forms a medium extending between the zinc container 1 and the carbon pole 8. It is apparent also that by raising the carbon bar 9, the pole 8 is lifted out of the electrolyte so that the battery is in this manner rendered inoperative. In other words, the battery can be rendered inoperative either by pulling up the pole or by inverting the battery, as desired.

It will also be noticed that when the rod 9 is pushed down both the binding posts 11 and 12 are disposed below the level of the top of the cardboard level 3 so that if the battery, when the parts are in the position shown in Fig. 2, is turned upside down so that the parts will be in the position shown in Fig. 3, the binding posts will not be injured. In this reverse position shown in Fig. 3 the amount of electrolyte, which has been predetermined, is such that its level is now disposed below the lower edge of the pole 8 so that no serious electrolytic action takes place.

In other words, the position shown in Fig. 1 is what we call the original position of the battery before any displacement of the position of the diaphragm has taken place. Fig. 2 is the operative position of the parts of the battery. Fig. 3 can be called the inoperative position of the battery.

In Figs. 4, 5 and 6 we show a substantially similar battery having the zinc container 1, a cardboard cover or casing 2 with the extended portion 3, similar binding posts, similar carbon poles and electrodes. In this case, however, the spacing ring 16 definitely holds the carbon pole 8 in the position shown in Fig. 4. In this modification, also, the carbon bar or rod 9 does not extend above the level shown in Fig. 4 and is not moved to render the battery inoperative. The partition 17 shown in Fig. 4 is similar to the partition 6 previously mentioned but is now actuated by means of a flexible connection or spring 18 which extends through a very tight aperture in the rubber sleeve or gasket 19 to a point without the battery. By pulling on this connection a diaphragm or partition 17 is displaced angularly to remove this partition from between the electrolyte and the carbon pole. When the battery is inverted to the position shown in Fig. 5 there will be contact between the liquid and the carbon pole and the zinc container. The displaced position of the diaphragm 17 is shown in Fig. 5. After the diaphragm has been displaced from the original position shown in Fig. 4 and the battery has been inverted to the position shown in Fig. 5, this inverted position is the operative position, whereas the position shown in Fig. 4 is the original position. The position of the parts shown in Fig. 6 is the inoperative position where the battery has been restored to its original position, but the liquid level is below the carbon pole and the diaphragm is displaced.

In Figs. 7 and 8 we have illustrated a battery in which the liquid chamber is at the upper end of the battery and is provided with the wax lining 4 previously referred to, with a cardboard cover 20 and a layer of asphaltum 21 thereover. The cap 10 on top of the carbon rod 9 is embedded in the asphalt 21. A spring 22 of any suitable material passes through the cover 20 and the layer of asphalt or other insulating medium 21 and at its inner ends is connected to the diaphragm 23 made of cardboard. This diaphragm, as shown in Fig. 8, is crimped, creased or otherwise similarly treated, as designated by the numeral 24, so that when the string is pulled the cardboard will bend or fold on the lines 24 and can be pulled up to disrupt the wax seal and to be displaced itself, so that the liquid 5 will flow into position between the electrode 8 and the zinc container 1. The electrode or carbon pole 8 permanently rests upon the bottom of the battery and is separated from the bottom of the zinc container 1 by a plate 25 of cardboard or other suitable material.

In the form shown in the first three figures, therefore, the carbon electrodes are moved to displace the diaphragm and move the electrodes into position so as to cause the electrolyte to be interposed therebetween. A reversal of the position of the battery as a whole from its operative to its inoperative position will cause the liquid to be removed from intimate contact between the zinc and the carbon whereby the action will be substantially stopped and the life of the battery thereby increased. In the modification shown in Figs. 4 to 6, however, the diaphragm is moved by some connection leading to the exterior of the battery, but it is necessary to invert the battery before it becomes operative. In the form shown in Figs. 7 and 8 the battery becomes operative as soon as the diaphragm is displaced, and it is necessary to invert the battery in order to render it inoperative. In this last respect it is similar to the batteries shown in Figs. 1 to 3. In Figs. 4, 5 and 6 the spacing ring 16 is disposed so as to hold the carbon electrodes definitely in the position shown.

What we claim is:

1. A battery comprising a container forming one pole of the battery, a second pole of the battery disposed within said container, a spacing ring between said pole to hold the inner pole in position within the container, a portion of the inner pole extending out of the battery through the container, and an insulating sleeve around this portion of said pole to insulate the two poles.

2. A battery comprising a container forming one pole thereof, a second pole disposed within the container, an electrolyte chamber at one end of the battery, insulating means between the electrolyte and the container along this portion of the container, a diaphragm between the electrolyte and the inner pole separating the electrolyte chamber from the rest of the battery, and means for displacing said diaphragm without destroying it.

3. A battery comprising a container forming one pole thereof, a second pole disposed within the container, an electrolyte chamber at one end of the battery, insulating means between the electrolyte and the container along this portion of the container, a diaphragm between the electrolyte and the inner pole separating the electrolyte chamber from the rest of the battery, and means for displacing said diaphragm without destroying it, the electrolyte and the poles being so predetermined as to relative volume and space occupied thereby as not to come in contact with each other until the battery is inverted.

4. A battery comprising an electrolyte compartment, an electrode compartment, a diaphragm attached to one of the electrodes and separating the compartments, a portion of said electrode extending beyond the battery to be moved by the hand of the operator, said diaphragm when the electrode is moved by the operator being displaced to cause the disposition of the electrolyte in contact between the electrodes, the amount of liquid and the amount of space occupied thereby and by the electrode being such that after the liquid and the electrodes are brought in contact they can be separated by inverting the battery.

DAVID ROSEN.
CONRAD SCHICKERLING.